United States Patent [19]

Michl et al.

[11] Patent Number: 4,477,408

[45] Date of Patent: Oct. 16, 1984

[54] BLOW MOLDING METHOD

[75] Inventors: Michael J. Michl, Rosedale; Larry W. English, Terre Haute, both of Ind.

[73] Assignee: Hercules Incorporated, Wilmington, Del.

[21] Appl. No.: 473,290

[22] Filed: Mar. 8, 1983

Related U.S. Application Data

[63] Continuation-in-part of Ser. No. 6,367,139, Apr. 9, 1982, abandoned.

[51] Int. Cl.³ .............................................. B29C 17/07
[52] U.S. Cl. .................................... 264/532; 264/542; 425/529; 425/532; 425/538
[58] Field of Search ................ 264/532, 542; 425/529, 425/532, 538

[56] References Cited

U.S. PATENT DOCUMENTS 2,790,994  5/1957  Cardot et al. .................... 264/532 X
3,541,189  11/1970  Yoshikawa et al. ............. 264/532 X
3,844,700  10/1974  Sokolow ......................... 425/529 X Primary Examiner—Jan Silbaugh
Attorney, Agent, or Firm—Dale R. Lovercheck

[57]  ABSTRACT

A blow molding method for forming a chain of hollow, shaped article bodies of biaxially oriented, normally highly crystalline thermoplastic material from a tube of the material in substantially unoriented condition, but at its orientation temperature, which includes pulling the tube from a first point to a second point, and pushing beyond the second point that portion of the chain formed between the two points; braking the travel of the tube past the first point during at least part of the time it is being pulled, whereby the part of the tube between the points becomes stretched; closing the corresponding mold pieces of a plurality of stationary blow molds on the stretched part of the tube; inflating the portions of the stretched part of the tube within the mold cavities defined by the corresponding mold pieces to form in each the mold cavity one of the bodies, and to biaxially orient the material thereof; and sequentially opening the mold pieces, following the inflating, to minimize snap-back of the chain.

2 Claims, 11 Drawing Figures

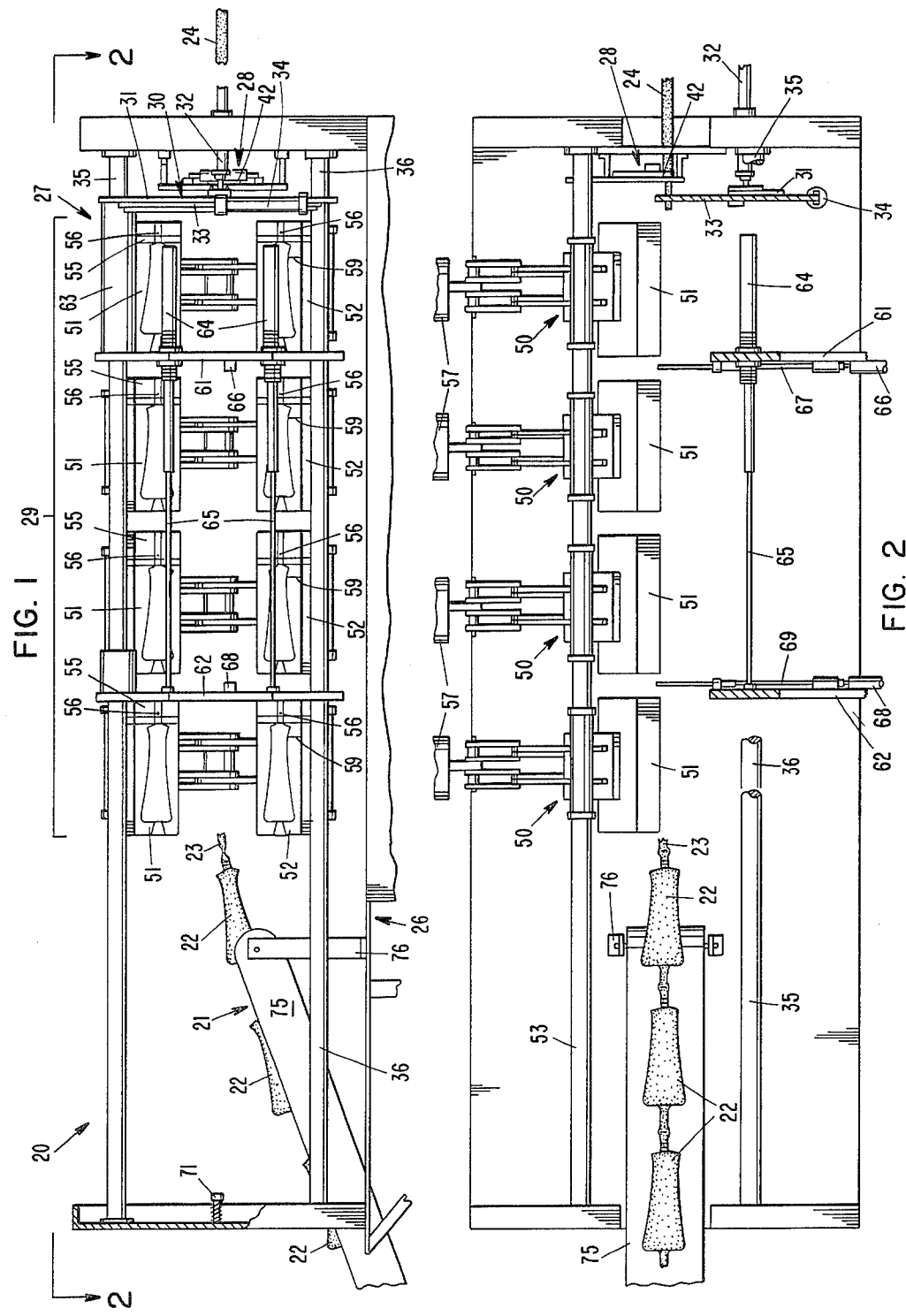

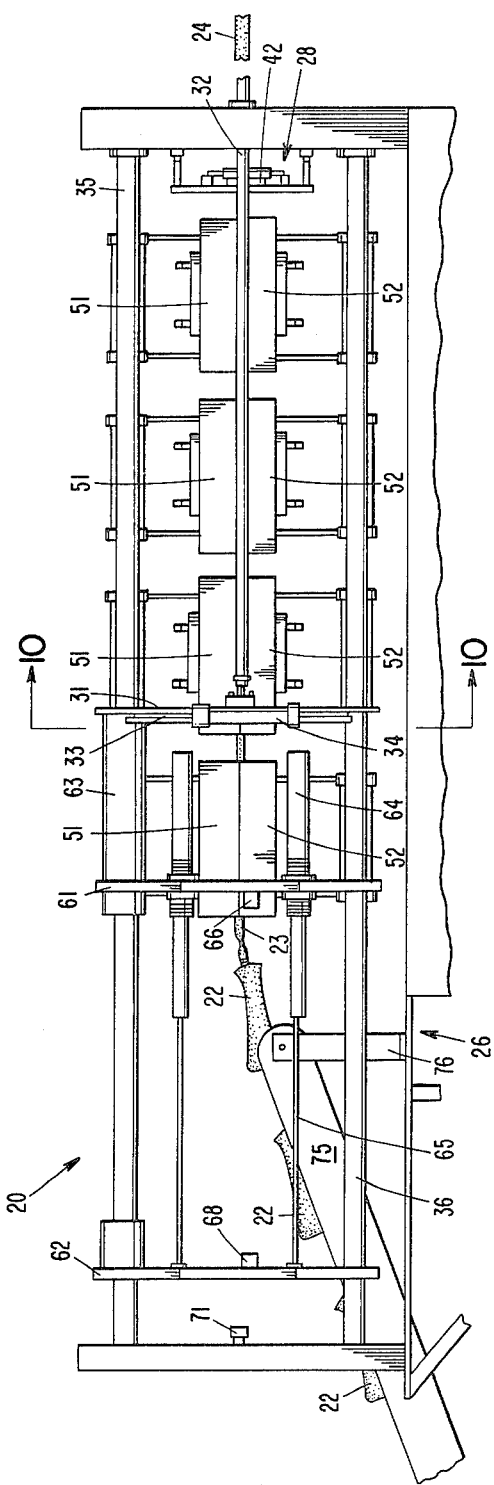

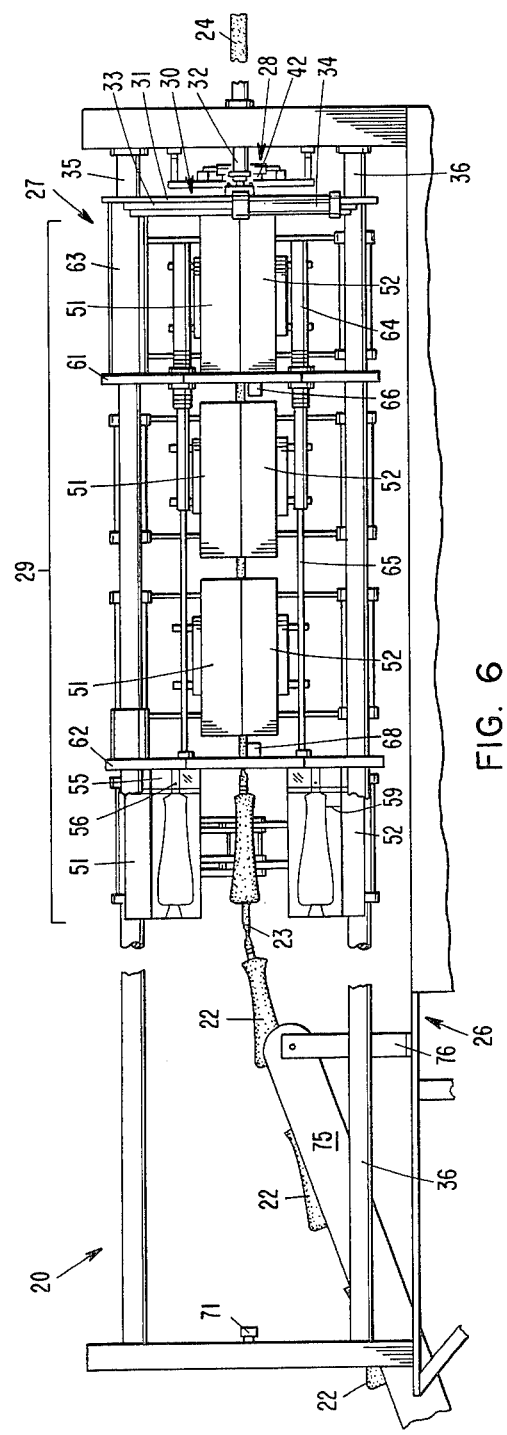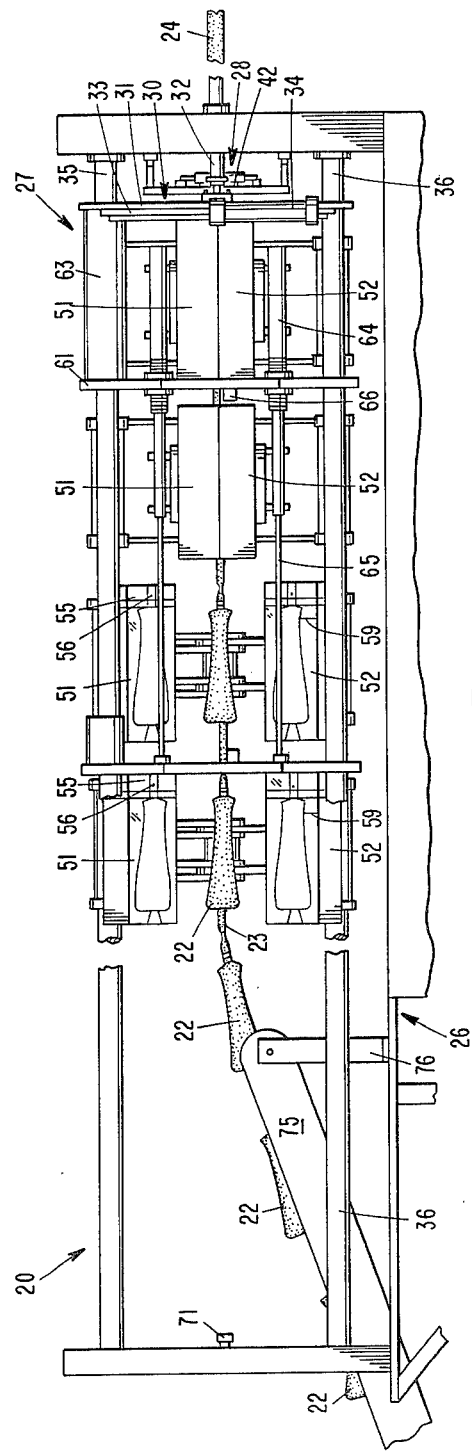

BLOW MOLDING METHOD

The application is a continuation-in-part of the co-pending application, Ser. No. 06/367,139, filed Apr. 9, 1982, now abandoned.

BACKGROUND OF THE INVENTION

1. Field of the Invention

This invention relates to the art of blow molding of thermoplastic materials. More particularly, it relates to ways and means for blow molding shaped articles from a normally highly crystalline thermoplastic material such as polypropylene and the like, that must be biaxially oriented to achieve certain desirable properties such as high strength, clarity, and the like.

2. Description of the Prior Art

The manufacture of shaped, hollow articles, for example, containers such as bottles and the like, from said thermoplastic material has been accomplished by blow molding methods. Two such general methods start with a continuous tube that has been extruded from the thermoplastic material, cooled to crystallize the material, and then subjected to heat treatment. Examples of such heat treatment are disclosed in the U.S. Pat. Nos. Re 26,956 and 3,496,258, to Wiley, and the U.S. Pat. No. 3,677,530, to MacDuff.

In one method a piece of the tube, the material of which generally is at its orientation temperature, is cut and the cut piece, referred to as a parison, is grabbed at each end and longitudinally stretched. While the parison is in the stretched condition, the mold pieces of a blow mold are closed upon the tube, and the tube is expanded, generally by blowing air into the parison to form the body of the desired article. The mold pieces are then opened, the formed body is removed, and the cycle is repeated. This method has a number of disadvantages, one of which is that the production rate is inherently low.

In the second general blow molding method, the tube is basically left intact. In one embodiment of this general method a "hand-over-hand" longitudinally stretching and blow molding technique is used to make a chain of hollow bodies of the desired shaped article. This is shown in the U.S. Pat. Nos. 3,699,199, 3,704,188 and 3,798,295, to MacDuff, and the U.S. Pat. Nos. 3,751,542 and 3,834,852, to Hall. In this embodiment two moveable blow molds are involved. The mold pieces of the first blow mold at a first position are closed on the tube, and the blow mold is then moved away a predetermined distance to a second position. During this movement of the mold the portion of the tube within the blow mold is blown into the shape of the mold cavity, and the portion of the tube trailing the blow mold is pulled by the blow mold from a first point to a second point. Throughout the pull of the tube or at a preselected time during the pulling of the tube, its travel past the first point is restricted as by a restrictor cone or by a clamp so that the portion thereof between the two points becomes longitudinally stretched by the time the first mold reaches the second position. In the meantime, the second blow mold with its mold pieces open and straddling the first blow mold with its mold pieces closed is returned from the second position to the first position, and the mold pieces are closed on said stretched portion of the tube. The mold pieces of the first blow mold are opened. The second closed blow mold then is moved to the second position to push away the blow molded body from between the opened pieces of the first blow mold, and at the same time pull the trailing portion of the tube from the first point to the second point. Throughout the pull of the tube by the second blow mold or at a preselected time during the pull, the movement of the tube past the first point is restricted, and the portion of the tube between the two points becomes longitudinally stretched by the time the second blow mold has reached the second position. As in the case of the first blow mold, during this forward movement of the second blow mold the stretched portion of the tube within the mold is blown to expand the tube into conformance with the shape of the mold cavity, whereby the body is formed and the material becomes biaxially oriented. The blow molded body pushed from between the opened pieces of the first blow mold is linked by an unexpanded portion of the tube to a previously formed chain of linked together blow molded bodies. This chain is conveyed from the machine to a finishing operation in which the bodies are separated and trimmed, and the article mouths or necks or other openings are bored or cut to give the finished articles.

The machine and method described herein are significant improvements of the "hand-over-hand" machine and method.

SUMMARY OF THE INVENTION

The blow molding machine disclosed in the specification is adapted to receive the continuous tube of substantially biaxially unoriented, normally highly crystalline thermoplastic material at its orientation temperature, form the tube into a chain of hollow, shaped article bodies of the material in the biaxially oriented condition, and discharge the chain of bodies.

The machine comprises a tube and chain transporter, a tube brake, and a stationary blow mold assembly.

The tube and chain transporter comprises tube engagement means, a shuttle, and a shuttle prime mover. The shuttle is moved back and forth between a first position and a second position by the shuttle prime mover. The tube engagement means are carried by the shuttle and function to grip the tube and upon forward movement of the shuttle to pull the tube from a first point to a second point, and to push beyond the second point that portion of the chain of hollow, shaped article bodies formed between the two points, and to release the tube after the mold pieces of the stationary blow mold assembly have closed on the portion of the tube between the two points.

The tube brake comprises means to brake the travel of the tube past said first point during at least part of the time it is pulled to the second point, whereby the part of the tube between said points becomes longitudinally stretched. In one embodiment the brake means comprises a restrictor cone through which the tube passes. However, in preferred embodiments of the invention the tube brake comprises a stationary clamp, the jaws of which are moveable to a tube engaging and gripping position, and to an open position by a prime mover for the clamp jaws.

The stationary blow mold assembly comprises at least one stationary blow mold between said two points. While in the less preferred embodiments only one blow mold is present in the assembly, in preferred embodiments the assembly has a plurality of blow molds. Each blow mold in the assembly comprises at least two mold pieces, at least one of which is movable in place from a closed position in abutment with the other mold piece to an open position whereat it is spaced apart from the other mold piece sufficiently for the tube to be pulled between the mold pieces from said first point to the second point, and the hollow, shaped article body formed in the mold to be pushed away from the mold. The mold pieces when in closed position are in abutment and define a cavity having the exterior shape of the article body to be blow molded therein. Prime mover means are provided for moving in place said one or both of the mold pieces from the open to the closed position. The prime mover means can be a reversible electric motor or an air or hydraulic fluid actuated piston-cylinder assembly or the like. The blow mold further comprises means for injecting air into the portion of the tube in the mold cavity after the mold pieces have been closed on the portion of the tube longitudinally stretched between said two points. Preferably the faces of the mold pieces are contoured to pinch the ends of the part of the stretched tube in the cavity into air tight seals to enable air evacuation of the mold cavity, introduction of air into the interior of the part of the tube within the cavity, or both, to inflate and expand said part into conformity with the shape of the cavity. Preferably each mold piece has passages for circulating a coolant through the interior of the mold to enable the blown hollow, shaped article body walls to be cooled to a temperature at which the tube material becomes set or frozen. Also, it is within the scope of this invention for the blow mold to comprise thread forming means for those blow molded bodies intended for finishing as threaded neck bottles or the like for use with threaded caps.

For normal operation of the machine, the distance between the two points, the rate at which the tube is pulled by the tube and chain transporter, and the braking of the tube, whether by a restrictor cone, a stationary clamp, or the like, are selected so that when the tube is pulled to the second point, the portion of the tube between the two points becomes longitudinally stretched, preferably to the extent that the material of the tube is longitudinally oriented.

Each cycle of operation of the machine has three steps: the tube and chain transport step, the blow molding step, and the blow mold opening step. At the commencement of the tube and body transport step the mold pieces of the stationary blow mold assembly are open, and the tube and chain transporter is at its first position. The tube engagement means are made to grip the tube preferably in the region of the first point, and with the tube so gripped, the transporter is moved to its second position to pull the tube away from the first point to a second point and to push beyond the second point that portion of the chain formed between the two points. In those embodiments in which the tube brake is a restrictor cone, the tube commences to longitudinally stretch immediately. In those embodiments in which a movable jaw clamp or the like is employed, the clamp jaws are moved into gripping engagement with the tube to stop the movement of the tube past the clamp whereupon the tube becomes longitudinally stretched. When the transporter has reached its second position, the mold pieces of the stationary blow molding assembly close upon the longitudinally stretched part of the tube between the two points, and by way of air injection, cavity air evacuation or both, the portion of the tube in each cavity is inflated until it conforms to the shape of the cavity. In the meantime, upon closure of the mold pieces upon the stretched part of the tube, the transporter tube engagement means release the tube, and the transporter is returned to its first position. The mold pieces are then opened and the procedure is repeated.

In those embodiments of the machine in which the stationary blow molding assembly comprises a plurality of stationary blow molds, there is a tendency, upon simultaneous opening of the mold pieces, for the chain to snap back. This is due primarily to elastic recovery and to a minor degree temperature shrinkage. To minimize this effect, in preferred embodiments the mold pieces are opened sequentially. Preferably they are opened sequentially beginning with the stationary blow mold nearest the second point, followed by the adjacent mold. In those embodiments in which more than two stationary blow molds are present, the next adjacent stationary mold is opened, and so on to the stationary blow mold nearest the first point.

Also, in those embodiments in which the stationary blow mold assembly comprises a plurality of stationary blow molds, the greater the number of blow molds, and thus the longer the chain to be formed between the two points, the greater is the tendency for the chain to flex when the tube and chain transporter is moved from its first position to its second position. Such flexure of the chain can lead to difficulties in pushing the chain beyond the second point. Consequently, preferably in these embodiments of the machine chain carrier means are provided for carrying the chain while it is pushed beyond the second point. In the preferred embodiment of the machine of this invention the chain carrier means comprise movable rods which, when the tube and chain transporter is in its first position and the mold pieces are closed on the stretched part of the tube, are placeable under the portions of the tube outside the blow molds, namely, the links of the chain, remain under said links after said mold pieces have opened and the transporter has been moved from said first position to the second position, and are movable to avoid the closed mold pieces upon travel of the transporter from the second position to the first position.

BRIEF DESCRIPTION OF THE DRAWINGS

The best mode now contemplated of carrying out the invention is illustrated by a preferred embodiment of a blow molding machine of this invention, which is shown in the drawings which form a material part of these disclosures. In the drawings:

FIG. 1 is a side view of the preferred embodiment with the various movable parts thereof in position ready for commencement of the tube pulling and chain pushing step in the normal cycle of operation of the machine, in which view part of the support structure, previously formed portion of the chain 21 within the blow molding zone of the machine, and all of the hoses, wiring, cables, switches and the like have been partially removed or omitted to reveal inner structures and to simplify the view;

FIG. 2 is a plan view of the machine as shown in FIG. 1;

FIG. 4 is a similar side view of the machine, but showing the moveable parts thereof in their positions shortly after the blow molding step of the cycle of operation of the machine has begun;

FIG. 6 is a similar side view of the machine, but showing the positions of moveable parts just after the blow mold opening step of the cycle of operation of the machine has begun;

FIG. 7 is a similar side view of the machine, but showing the position of the movable parts midway through the mold opening step;

FIG. 10 is a cross-section of the machine, taken as indicated by the sectioning plane 10—10 of FIG. 4;

DETAILED DESCRIPTION OF THE DRAWINGS

Structure

Figure 3:
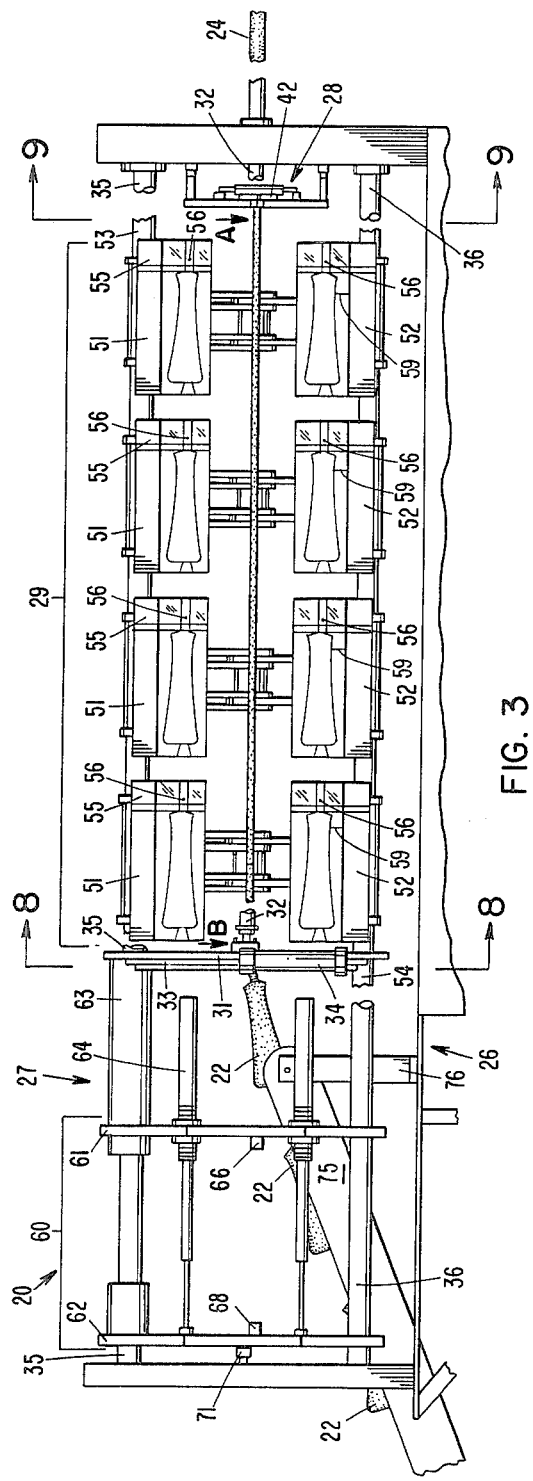
FIG. 3 is a similar (with respect to omitted and partially removed parts etc.) side view of the machine, but showing the moveable parts thereof and tube 24 at the end of the chain pushing and tube pulling step of the cycle of operation of the machine.

More specifically, FIGS. 1-7 of the drawings illustrate a blow molding machine 20 for making a chain 21 of threaded top bottle bodies 22 connected by links 23, which bodies are composed of a biaxially oriented, normally highly crystalline thermoplastic material, from a continuous tube 24 of said material which is substantially biaxially unoriented and at its orientation temperature.

The machine 20 comprises a support structure 26 on which is mounted a moveable tube and chain transporter 27, a stationary tube brake 28, and a blow mold assembly 29.

Figure 8:
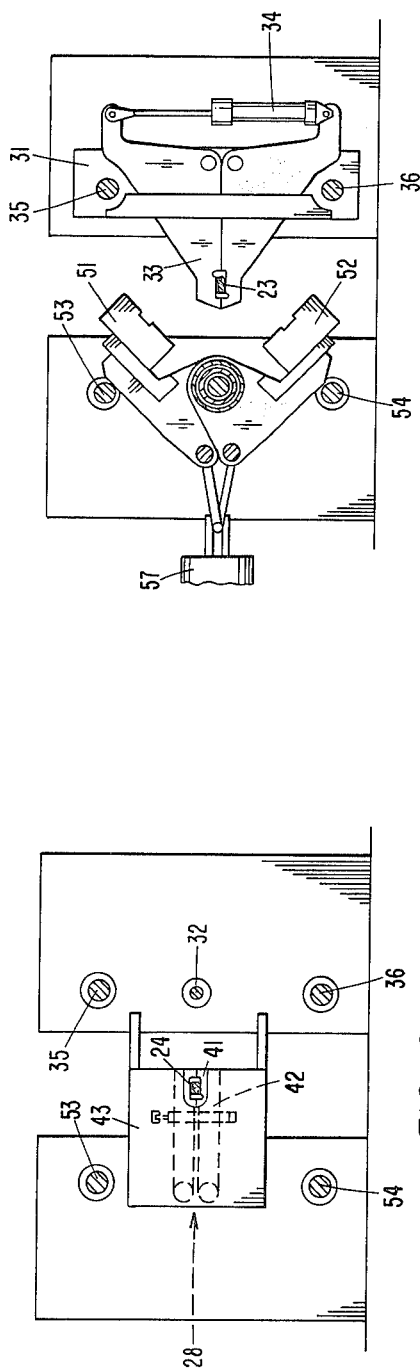
FIG. 8 is a cross-section of the machine, which view has been taken as indicated by the sectioning plane 8—8 of FIG. 3.

The tube and chain transporter 27 (FIGS. 1 and 2) comprises a tube clamp 30, a shuttle 31 and a prime mover (only part of which is shown). The tube clamp 30 (FIGS. 8 and 10) comprises a pair of clamp jaws 33 pivotly mounted on the shuttle 31. The clamp jaws are opened and closed by a jaws prime mover 34 which in this embodiment is an air cylinder piston and piston rod combination. The shuttle 31 is a plate slideably mounted on upper and lower longitudinal bars 35 and 36 of the support structure 26. The prime mover comprises a longitudinal piston rod 32 of an air or hydraulic fluid activated piston-cylinder assembly, the cylinder of which is stationarily mounted in front of the machine.

Figure 9:
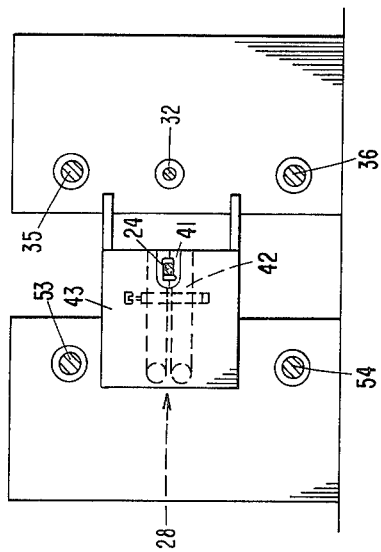
FIG. 9 is a cross-section of the machine, taken as indicated by the sectioning plane 9—9 of FIG. 3.

The tube brake 28 (FIG. 9) in this embodiment comprises a pair of clamp jaws 41, a prime mover 42 for these jaws, and a support plate 43. The jaws are pivotally mounted on the support plte 43 and positioned to close on and in a gripping relationship with the tube 24 in the front part of the machine. The clamp jaws are opened and closed by means of the prime mover 42 which in this embodiment is an air cylinder and piston rod combination connected at both ends to the clamp jaws. The support plate 43 is secured to the support structure 26 of the machine.

The stationary blow mold assembly 29 comprises a plurality of stationary blow molds 50 (FIG. 2). Each stationary blow mold 50 in this embodiment comprises (FIG. 1) an upper mold piece 51 and a lower mold piece 52. The upper mold piece is mounted for transverse rotation on a longitudinal bar 53 (FIG. 2) of the support structure 26, while the lower mold piece is transversely rotatably mounted on a longitudinal bar 54 (FIGS. 3, 8 and 9) of the support structure. In other embodiments the two mold pieces, instead of being over and under the path of travel of the tube 24, when they are in open position, are on each side of the path of travel with the other structural elements of the machine being suitably arranged. In all embodiments, in closed position (FIGS. 4, 5 and 10) the mold pieces define a cavity conforming to the exterior shape of the bottle body 22. In addition, the faces of the mold pieces are configured so that when closed on the tube 24, the ends of the part of the tube inside the closed mold pieces are pinched into permanent airtight seals. Because in the embodiment shown the desired article is an exterior threaded top bottle, each stationary blow mold is equipped with a thread forming and neck cramming assembly 55, (only part of which are diagrammatically shown in FIG. 1) such as disclosed in the U.S. Pat. No. 3,834,852, to Hall. Each mold piece in this embodiment is provided with a tube pierceable, extendable and retractable, air blow pin 56 (see FIGS. 1 and 3) for blowing air into the part of the tube within the closed mold pieces. Also, the mold pieces are provided with a vent 59 (FIG. 1) to permit the escape of air between that part of the tube and the mold cavity wall while the tube is being laterally expanded by the flow of air through the air blow pin 56. In addition, the mold pieces have internal passageways for the circulation of coolant. These passageways are coupled through end couplings to coolant hoses (not shown). The mold pieces are linked to a prime mover 57 (FIGS. 2, 8 and 10) for rocking the mold pieces from an open position (FIG. 8) to their closed position (FIG. 10). While in some embodiments of this invention the prime mover can be a reversible motor, in this embodiment the prime mover 57 is an air cylinder, piston, and piston rod arrangement.

Figure 11:
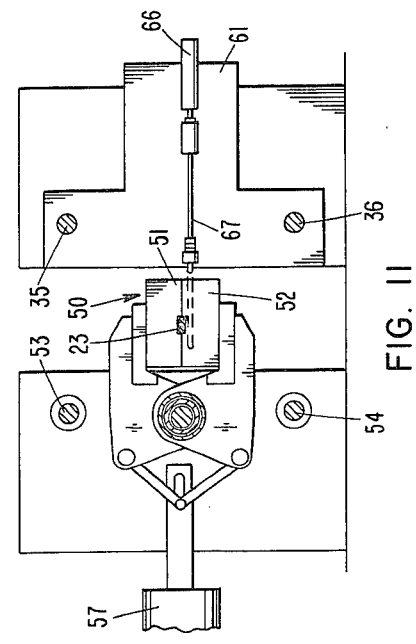
FIG. 11 is a cross-section of the machine, taken as indicated by the sectioning plane 11—11 of FIG. 5.

The transporter 27 in addition to the tube clamp 30 comprises a chain carrier 60. This is an assembly (FIGS. 1, 2 and 11) comprising a front support plate 61 and a back support plate 62, both of which are slidably carried by the upper and lower longitudinal transporter support bars 35 and 36. The front support plate 61 is joined by a cylindrical spacer 63 around the upper longitudinal bar 35 to the shuttle 31. The back support plate 62 is likewise spaced from the front support plate 61 and is joined thereto by an intermediate structure. In those circumstances in which the length of the machine poses no problem, the intermediate structure can be another cylindrical spacer. However, in the embodiment shown, which embodiment is particularly useful in those circumstances in which space for the machine is limited, the intermediate structure is adapted to permit the chain carrier structure 60 to "collapse" longitudinally at the second position (FIG. 3) of the transporter 27. Thus the intermediate structure comprises a pair of longitudinally oriented air cylinders 64 mounted on the front support plate 61 with the piston rods 65 of the cylinders joined as connecting rods to the back support plate 62. Mounted on the front support plate 61 is a transversely disposed air cylinder 66 with an internal piston and a piston rod 67 which, when fully extended (FIG. 2 and in relief in FIG. 11), is disposed as a chain carrier pin subjacent the chain link 23 between the first and second stationary blow molds 50 when closed. Mounted on the back support plate 62 (FIG. 2) is another transverse air cylinder 68 with an internal piston and an extendable and retractable piston rod or chain carrier pin 69. When the connecting rods 65 are fully extended from the longitudinal air cylinders 63 mounted on the front support plate 61, and the shuttle 31 is in its first position at the beginning of the mold opening step in the normal cycle of operation of the machine, the carrier pin 69 is extended and is disposed subjacent the chain link 23 between the last two blow molds 50 in the blow mold assembly 29.

The blow molding machine embodiment 20 shown in the drawings is intended to be used with a continuous belt exit conveyor 75 for the chain 21 of bottle bodies 22 as shown in the drawings (FIG. 1-5). The front end of the conveyor 75 is mounted on a bracket 76 on the machine support structure 26 in the region of the last stationary blow mold 50 in the blow mold assembly 29.

Operation

Figure 5:
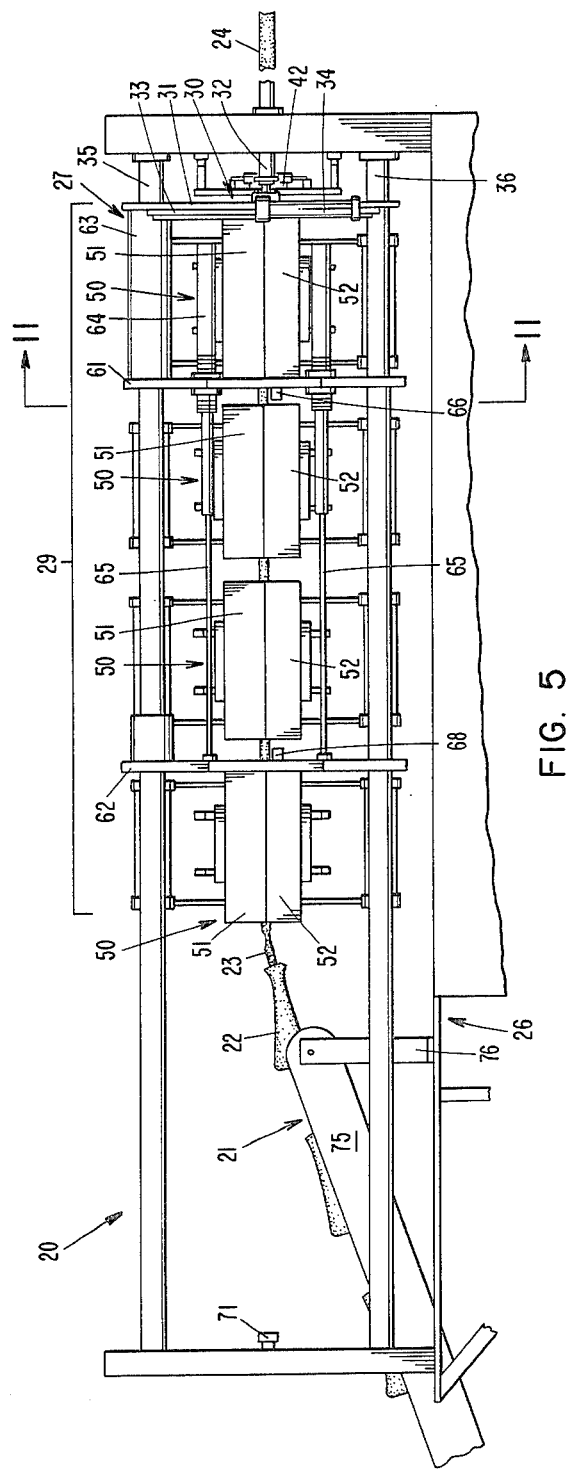
FIG. 5 is a similar side view of the machine, but showing the positions of the movable parts at the end of the blow molding step.

The machine 20 is a continuously acting machine with each cycle of operation comprising three basic steps. The first step is the tube pulling and stretching (as well as chain pushing) step (FIGS. 1 and 2). The second step is the blow molding step (FIGS. 4 and 5). The third step is the stationary blow mold opening step (FIGS. 6 and 7).

At the beginning of the first step the upper and lower mold pieces 51 and 52 are in open position, and the transporter is at its front end position with the back support plate 62 in extended position from the front support plate 61. The clamp jaws 33 of tube clamp 30 carried by the transporter 27 are in closed position, gripping the tube 24 of substantially biaxially unoriented thermoplastic material at its orientation temperature. The transporter 27 is then pushed by the rod 32 of the prime mover to its second position (FIG. 3) to thereby pull a length of the tube 24 into the machine, and at the same time the exit conveyor 75 is started. At approximately one-third of the longitudinal distance traveled by the tube clamp 30, the brake clamp jaws 41 are closed on the tube whereby when the transporter 27 reaches said second position, (FIG. 3), the portion of the tube beginning at the tube brake 28, (point A), and ending at the second or rear stop position (point B) of the tube clamp 30, is longitudinally stretched, preferably to the extent that the tube material becomes longitudinally oriented. Approximately two-thirds of the distance between the starting position of the transporter tube clamp 30 and its rear stop position, the carrier pin 69 on the back carrier plate 62 of the chain carrier 60 is retracted and the air on the longitudinal air cylinders 64 is dumped, thereby allowing the connector rods 65 to retract to enable the chain carrier 60 to collapse longitudinally as it reaches the end of its rearward travel. Upon the transporter 27 reaching the second position, the carrier pin 67 on the front support plate 61 of the chain carrier assembly 60 is retracted, and the exit conveyor 75 is stopped. This completes the first step of the operating cycle of the machine.

In the second step of the cycle of operation, the mold pieces are closed upon the stretched portion of the tube 24 between points A and B, (see FIG. 4), and the tube clamp 30 of the transporter 27 is opened to the extent that the clamp jaws 33 thereof are out of alignment with the closed mold pieces 51 and 52 of the stationary blow molds 50 (see FIG. 10). The transporter 27 then is pulled back to its first position at the front of the machine, while the longitudinal cylinders 64 on the front support plate 61 are pressurized to extend the connector rods 65 and "expand" longitudinally the chain carrier assembly 60. When the transporter 27 has returned to its first position, the back support plate 62 is positioned so that the carrier pin 69 is located for extension into position subjacent the link 23 between the last two stationary blow molds 50 of the stationary blow mold assembly 29. In the meantime, while the transporter 27 is being returned to its starting position, the blow pins 56 in the individual stationary blow molds 50 are inserted into the parts of the stretched portion of the tube 24 within the molds, air under pressure is blown through the pins 56 into the mold encased parts, expansion of the parts to conform to the mold cavities occurs, and the mechanisms of the screw thread and neck cramming assemblies 55 are actuated.

At the commencement of the stationary blow mold opening step the chain carrier pins 67 and 69 are extended and then the individual stationary blow molds 50 are opened one (FIG. 6) by one (FIG. 7), starting with the blow mold closest to the second or rear stop point B and proceeding toward the first blow mold closest to the first or starting point A. Upon opening of all of the stationary blow molds, the cycle of operation is completed.

Thus there is provided a blow molding machine of inherently high production rate. The only limit on the number of blow molds is the maximum length to which the tube 24 can be pulled and stretched before the weight of the tube between the two points A and B causes the tube to sag to an impractical extent.

Hence, the blow molding machine and the method herein disclosed have a major advantage over the hand-over-hand machine and method of the prior art.

Other advantages, features and embodiments of the blow molding machine and method disclosed herein will be readily apparent to those exercising ordinary skill after reading the foregoing disclosures. In this regard, while specific embodiments of the machine and method have been described in considerable detail, variations and modifications of these embodiments can be effected without departing from the spirit and scope of the invention as described and claimed.

We claim:

1. A blow molding method for forming a chain of hollow, shaped article bodies of biaxially oriented, normally highly crystalline thermoplastic material from a tube of said material in substantially unoriented condition, but at its orientation temperature, which comprises:

pulling said tube from a first point to a second point, and pushing beyond said second point that portion of the chain formed between said two points;

braking the travel of said tube past said first point during at least part of the time it is being pulled, whereby the part of said tube between said points becomes stretched;

closing the corresponding mold pieces of a plurality of stationary blow molds on said stretched part of said tube;

inflating the portions of the stretched part of the tube within the mold cavities defined by said corresponding mold pieces to form in each said mold cavity one of said bodies, and to biaxially orient the material thereof; and sequentially opening said mold pieces, following said inflating, to minimize snap-back of said chain.

2. A method according to claim 1 in which said closed mold pieces are opened sequentially starting with the stationary blow mold closest to said second point.

* * * * *